(12) United States Patent
Gelfer et al.

(10) Patent No.: US 10,184,039 B2
(45) Date of Patent: *Jan. 22, 2019

(54) SYNTACTIC POLYURETHANE ELASTOMER BASED ON SOFT SEGMENT PREPOLYMER AND NON-MERCURY CATALYST FOR USE IN SUBSEA PIPELINE INSULATION

(71) Applicant: Dow Global Technologies LLC, Midland, MI (US)

(72) Inventors: Mikhail Y. Gelfer, Sugarland, TX (US); Amber Stephenson, Lake Jackson, TX (US); Mark Brown, II, Richwood, TX (US)

(73) Assignee: Dow Global Technologies LLC, Midland, MI (US)

( * ) Notice: Subject to any disclaimer, the term of this patent is extended or adjusted under 35 U.S.C. 154(b) by 50 days.

This patent is subject to a terminal disclaimer.

(21) Appl. No.: 15/025,182

(22) PCT Filed: Oct. 21, 2014

(86) PCT No.: PCT/US2014/061605
§ 371 (c)(1),
(2) Date: Mar. 25, 2016

(87) PCT Pub. No.: WO2015/065772
PCT Pub. Date: May 7, 2015

(65) Prior Publication Data
US 2016/0229978 A1 Aug. 11, 2016

Related U.S. Application Data (60) Provisional application No. 61/897,359, filed on Oct. 30, 2013.

(51) Int. Cl.
*B05D 3/00* (2006.01)
*B05D 7/00* (2006.01)
(Continued)

(52) U.S. Cl.
CPC ............ *C08J 9/32* (2013.01); *B05D 3/007* (2013.01); *B05D 7/52* (2013.01); *C08G 18/10* (2013.01);
(Continued)

(58) Field of Classification Search
CPC . B05D 1/00; B05D 5/00; B05D 3/007; B05D 7/52; B05C 9/06;
(Continued)

(56) References Cited

U.S. PATENT DOCUMENTS 3,177,902 A * 4/1965 Rubenstein ............. B28B 21/64
138/145
4,169,906 A * 10/1979 Hallstrom ............... F16L 57/06
138/110
(Continued)

FOREIGN PATENT DOCUMENTS

CN 103214648 A 7/2013
DE 299120 A 4/1992
(Continued)

OTHER PUBLICATIONS

English translation of JP2007045980-A. 2017 (Year: 2017).*

*Primary Examiner* — Dah-Wei D. Yuan
*Assistant Examiner* — Hai Y Zhang (57) ABSTRACT

Syntactic polyurethane elastomers are made using a non-mercury catalyst. The elastomer is made from a reaction mixture containing a prepolymer made from a polyether polyol and a polyisocyanate, a chain extender, a polyisocyanate and microspheres. The elastomer adheres well to itself, which makes it very useful as thermal insulation for pipelines and other structures that have a complex geometry.

7 Claims, 2 Drawing Sheets

(51) Int. Cl.

| | |
|---|---|
| *B05D 1/00* | (2006.01) |
| *B05D 5/00* | (2006.01) |
| *B05C 9/06* | (2006.01) |
| *C08J 9/32* | (2006.01) |
| *C08G 18/48* | (2006.01) |
| *C09D 175/08* | (2006.01) |
| *C08G 18/76* | (2006.01) |
| *C08G 18/10* | (2006.01) |
| *C08G 18/22* | (2006.01) |
| *C08G 18/32* | (2006.01) |
| *C08K 7/28* | (2006.01) |
| *C08L 75/04* | (2006.01) |
| *F16L 59/14* | (2006.01) |

(52) U.S. Cl.
CPC ....... *C08G 18/222* (2013.01); *C08G 18/3206* (2013.01); *C08G 18/4841* (2013.01); *C08G 18/7657* (2013.01); *C08G 18/7671* (2013.01); *C08K 7/28* (2013.01); *C08L 75/04* (2013.01); *C09D 175/08* (2013.01); *F16L 59/14* (2013.01); *C08J 2375/04* (2013.01); *C08J 2375/08* (2013.01)

(58) Field of Classification Search
CPC ......... B05C 9/10–9/12; C08G 18/7671; C08G 18/222; C08G 18/7657; C08G 18/10; C08G 18/3206; C08G 18/4841; C08J 9/32; C08J 375/08; C08J 375/04
USPC ...................................... 427/385.5
See application file for complete search history.

(56) References Cited

U.S. PATENT DOCUMENTS

| | | | |
|---|---|---|---|
| 5,468,432 A | 11/1995 | Hurley | |
| 5,563,232 A | 10/1996 | Hurley | |
| 5,601,881 A * | 2/1997 | Grimm | B29C 47/0019 156/187 |
| 5,731,367 A | 3/1998 | Lee | |
| 5,939,145 A * | 8/1999 | Oram | B05B 13/0228 427/231 |
| 2004/0127672 A1 | 7/2004 | Heinz | |
| 2007/0100027 A1 | 5/2007 | Huntemann | |
| 2009/0129853 A1* | 5/2009 | Pionetti | B05D 1/002 403/23 |
| 2012/0202945 A1* | 8/2012 | Schmidt | C08G 18/10 524/590 |
| 2012/0211916 A1* | 8/2012 | Hardwick | B29C 39/006 264/135 |
| 2013/0178582 A1 | 7/2013 | Krause | |
| 2014/0107291 A1 | 4/2014 | Eisen | |

FOREIGN PATENT DOCUMENTS

| | | | | |
|---|---|---|---|---|
| EP | 607834 A | 7/1994 | | |
| EP | 639614 A | 2/1995 | | |
| EP | 1375577 A | 1/2004 | | |
| EP | 1785445 A | 5/2007 | | |
| EP | 2399946 A | 12/2011 | | |
| JP | 2007045980 A | * | 2/2007 | ............ C08G 18/16 |
| WO | 2001/032791 A | 5/2001 | | |
| WO | 2012/006264 A | 1/2012 | | |
| WO | 2012/126934 A | 9/2012 | | |
| WO | 2013/002974 A | 1/2013 | | |

* cited by examiner

SYNTACTIC POLYURETHANE ELASTOMER BASED ON SOFT SEGMENT PREPOLYMER AND NON-MERCURY CATALYST FOR USE IN SUBSEA PIPELINE INSULATION

This invention relates to syntactic polyurethane elastomers useful as subsea pipe and architecture insulation.

Subsea pipelines are used globally to deliver petroleum and/or natural gas from subsea wellhead collection facilities at the ocean surface. Cold sea temperatures can cause solid waxes and hydrates to form as the production fluids are pumped to the surface. This problem is ameliorated by applying a thermally-insulating layer to the exterior of the pipe.

Rigid polyurethane foams are widely used as thermal insulation. These are commonly made by reacting a polyisocyanate with a curing agent in the presence of a blowing gas. The blowing gas becomes trapped in cells in the foam. The trapped gas is largely responsible for the thermal insulation properties of the foam. In most applications, the polyurethane insulating foams are rigid materials. However, a highly rigid polyurethane is unsuitable as subsea pipeline insulation, because its mechanical strength is not sufficient to withstand high pressures typically encountered in subsea applications. The foam densifies and can collapse under the pressure of the seawater, and the densified material is a poor thermal insulator. In addition, the material is too brittle to withstand bending the pipeline undergoes during production, installation and use. An elastomeric insulating material is needed.

Therefore, so-called "syntactic" elastomers have been developed for the subsea pipeline applications. The syntactic elastomers contain hollow microspheres embedded in an elastomeric polyurethane matrix. The microspheres are generally made of glass or other hard material that can withstand the high undersea pressures.

The polyurethane matrix is a reaction product of a polyisocyanate, a "polyol" component and a "chain extender". The "polyol" is typically a polyether having 2 to 4 hydroxyl groups and an equivalent weight per hydroxyl group of 1000 to 6000. The "chain extender" is typically a diol having an equivalent weight of up to about 125. 1,4-butanediol is the most commonly used chain extender in these applications. The polyol, chain extender and polyisocyanate are mixed and cured in the presence of the microspheres to form the syntactic foam.

The curing reaction requires a catalyst to obtain reasonable production rates. For decades, the catalyst of choice has been an organomercury type, phenylmercury neodecanoate. This organomercury catalyst has many benefits. It provides a very useful curing profile. Reaction systems containing this organomercury catalyst react slowly at first and build viscosity gradually for a period of time. This characteristic provides valuable "open time", during which the reaction mixture can be degassed and introduced into the mold or other place where it is to be cured. After this slow initial cure, the polymerization rate accelerates, so curing times are reasonably short.

Polyurethanes made using organomercury catalysts also have very good physical properties.

The organomercury catalysts are coming under regulatory pressure, and there is now a desire to replace them with different catalysts. Although a very wide range of materials is known to catalyze the curing reaction, it has proven to be very difficult to duplicate the performance of the organomercury catalysts. Many catalysts fail to provide the favorable curing profile of organomercury catalysts. Even when the curing profile can be approximated using alternative catalysts, the good physical properties obtained using organomercury catalysts have proven to be difficult to duplicate.

One catalyst that has found use in syntactic polyurethane elastomer applications is a mixture of a zinc carboxylate and a small amount of a zirconium carboxylate. This catalyst provides a curing profile similar to, but not quite beneficial as, the organomercury catalysts. However, a very significant and previously unknown problem has been found when using this catalyst. The applied syntactic elastomer tends to crack. The cracking problem can be quite pronounced when the substrate has a complex exterior geometry such as when the substrate is branched or contains external surface features.

Another problem seen when using non-organomercury catalysts is that the polyurethane does not bond well to itself. This is a very significant shortcoming. It is common to apply the thermal insulation in multiple layers or to apply the thermal insulation to different portions of the substrate at different times. A bondline is formed where the separate layers or sections come into contact. Even when a single layer of polyurethane insulation is applied, bondlines form when the reaction mixture divides into multiple flow fronts as it flows around the part and the separate flow fronts meet. When the polyurethane does not adhere to itself very strongly, cracks appear at the bondlines. This leads to a loss of thermal insulation efficiency and can expose the underlying substrate to the corrosive effects of seawater.

What is needed in the art is a method of making a syntactic polyurethane elastomer, which does not contain a mercury catalyst, which is resistant to cracking even when cast in confined complex geometries and which bonds well to itself.

This invention is in one aspect a cured syntactic polyurethane elastomer which is a reaction product of a reaction mixture comprising an alkylene glycol chain extender, 5 to 50 weight percent, based on the weight of the reaction mixture, of microspheres, an isocyanate-terminated prepolymer having an isocyanate content of 3 to 12% by weight, and a non-mercury catalyst, wherein (i) the prepolymer is the reaction product of at least one polyether polyol having a number average hydroxyl equivalent weight of at least 800 with an excess of an aromatic polyisocyanate, (ii) the amount of prepolymer provided to the reaction mixture is sufficient to provide an isocyanate index of 80 to 130, and (iii) the reaction mixture is essentially devoid of mercury compounds.

The invention is also a method for making a syntactic polyurethane elastomer, comprising a) forming a reaction mixture containing an alkylene glycol chain extender, 5 to 50 weight percent, based on the weight of the reaction mixture, of microspheres, an isocyanate-terminated prepolymer having an isocyanate content of 3 to 12% by weight, and a non-mercury catalyst, wherein (i) the prepolymer is the reaction product of at least one polyether polyol having a number average hydroxyl equivalent weight of at least 800 with an excess of an aromatic polyisocyanate, (ii) the amount of prepolymer provided to the reaction mixture is sufficient to provide an isocyanate index of 80 to 130, and (iii) the reaction mixture is essentially devoid of mercury compounds, and b) curing the reaction mixture to form the syntactic polyurethane elastomer.

Surprisingly, the syntactic polyurethane elastomer of the invention is morphologically very similar to conventional syntactic polyurethane elastomers made in a one-step process (i.e., without first forming a prepolymer by reacting the starting polyisocyanate with the polyol) using a mercury catalyst. These morphological similarities are seen using microscopic methods such as atomic force microscopy (AFM) as described more fully below. The syntactic polyurethane elastomer contains small discrete morphological domains of the order of 0.1 to 3 µm in diameter and is substantially free of discrete morphological domains on the order of 5 to 30 µm in diameter. These small discrete morphological domains are believed to represent regions rich in "hard segment", i.e., the reaction product of the polyisocyanate and chain extender. Similarly sized discrete morphological domains are seen in conventional processes, using a mercury catalyst and without forming the prepolymer. When using a non-mercury catalyst without forming the prepolymer, the polyurethane often contains many large discrete morphological domains that are of the order of 5 to 30 µm across. It is believed that the morphological differences account at least in part for the difference in performance of elastomers made using mercury catalysts vs. non-mercury catalysts. The morphology of the Hg-GSPU systems correlates to better residual stress and shrinkage profile with acceptable application properties. The ability to simulate the morphology obtained with mercury-catalyzed systems without using a mercury catalyst is unexpected and quite advantageous.

The syntactic polyurethane elastomer of this invention also exhibits mechanical properties quite similar to those of conventional syntactic polyurethane elastomers made in the conventional one-step process with a mercury catalyst.

The process of the invention is suitable for applying a syntactic polyurethane elastomer to a substrate. Substrates of interest are parts that require thermal insulation. Subsea pipe and subsea architecture are substrates of particular interest.

An important advantage of this invention is that the syntactic polyurethane elastomer bonds well to itself and to other cured polyurethane elastomers. Thus, in certain embodiments, the invention is a process for producing a substrate having an applied syntactic polyurethane elastomer to a substrate. This process comprises the steps of a) forming a section of a syntactic polyurethane elastomer on at least a portion of the substrate by (1) applying a first reaction mixture containing an alkylene glycol chain extender, 5 to 35 weight percent, based on the weight of the reaction mixture, of microspheres, an isocyanate-terminated prepolymer having an isocyanate content of 3 to 12% by weight, and a non-mercury catalyst, wherein (i) the prepolymer is the reaction product of at least one polyether polyol having a number average hydroxyl equivalent weight of at least 800 with an excess of an aromatic polyisocyanate, (ii) the amount of prepolymer provided to the reaction mixture is sufficient to provide an isocyanate index of 80 to 130, and (iii) the reaction mixture is essentially devoid of mercury compounds, to at least a portion of the substrate and (2) at least partially curing the first reaction mixture to form the first section of syntactic polyurethane elastomer, and then b) forming a second section of syntactic polyurethane elastomer on at least a portion of the substrate by (1) applying a second reaction mixture containing an alkylene glycol chain extender, 5 to 35 weight percent, based on the weight of the reaction mixture, of microspheres, an isocyanate-terminated prepolymer having an isocyanate content of 3 to 12% by weight, and a non-mercury catalyst, wherein (i) the prepolymer is the reaction product of at least one polyether polyol having a number average hydroxyl equivalent weight of at least 800 with an excess of an aromatic polyisocyanate, (ii) the amount of prepolymer provided to the reaction mixture is sufficient to provide an isocyanate index of 80 to 130, and (iii) the reaction mixture is essentially devoid of mercury compounds to at least a portion of the substrate and in contact with the first section of syntactic polyurethane elastomer to form at least one bondline between the first section of syntactic polyurethane elastomer and the second reaction mixture and (2) at least partially curing the second reaction mixture to form the second section of syntactic polyurethane elastomer adherent to the first section of syntactic polyurethane elastomer.

For purposes of this invention, a chain extender is one or more compounds having two to three hydroxyl groups and a hydroxyl equivalent weight of up to 125. A preferred type of chain extender is an aliphatic glycol or glycol ether. The aliphatic glycol is a straight-chain or branched alkane having two hydroxyl groups. The glycol ether is a straight-chain or branched aliphatic ether or polyether. The hydroxyl equivalent weight preferably is up to 100 and more preferably up to 75. The hydroxyl groups are preferably on different carbon atoms. The chain extender more preferably is a straight-chain compound in which the carbon atoms are bonded to the terminal carbon atoms. Examples of chain extenders are ethylene glycol, 1,2-propylene glycol, 1,3-propane diol, 1,4-butane diol, 1,6-hexanediol, diethylene glycol, triethylene glycol, dipropylene glycol, tripropylene glycol, glycerin, trimethylol propane, trimethylolethane, or an alkoxylate of any of the foregoing having an equivalent weight of up to 125. Preferred among these are the α,ω-alkylene glycols such as ethylene glycol, 1,3-propane diol, 1,4-butane diol and 1,6-hexane diol. 1,4-butanediol is especially preferred.

The microspheres consist of a shell, which encapsulates either a vacuum or a gas. The shell is approximately spherical. It defines a hollow space, which contains the encapsulated vacuum or gas. The gas may be, for example, air, nitrogen, oxygen, hydrogen, helium, argon, a hydrocarbon or other gas. The shell is capable of withstanding the pressures encountered during the use of the syntactic polyurethane elastomer. The shell may be, for example, glass or other ceramic. The microspheres are generally of the non-expandable type. Non-expandable types are preferred. The microspheres may have a density of, for example, 0.1 to 0.6 g/cc. The particle size preferably is such that at least 90 volume percent of the microspheres have a diameter of 5 to 100 µm, preferably 10 to 60 µm. Glass microspheres are preferred. Suitable microspheres include commercially available products such as 3M™ Microspheres from 3M Corporation and Expancel™ microspheres from Akzo Nobel.

The microspheres constitute 5 to 50 weight percent, preferably 15 to 30 weight percent of the reaction mixture and the resulting syntactic polyurethane elastomer.

The prepolymer contains 3 to 12% by weight, preferably 6 to 12% by weight, isocyanate groups. The prepolymer is a reaction product of at least one polyether polyol having a number average hydroxyl equivalent weight of at least 1000 with an excess of an aromatic polyisocyanate. The prepolymer may contain some amount of the starting aromatic The prepolymer/chain extender system of this invention may cure more rapidly than conventional syntactic polyurethane elastomer systems. If a slower cure is wanted or needed, some or all of the isocyanate groups on the prepolymer may be blocked to reduce their reactivity towards the chain extender. For example, 5-50% or 5-20% of the isocyanate groups can be blocked. Blocking is achieved by reacting the prepolymer with a blocking agent; the amount of blocking agent used corresponds to the proportion of isocyanate groups to be blocked. Examples of blocking agents include, for example, phenols such as phenol, bisphenol A azoles such as 1,2,4-triazole, 2-methylimidazole, 3-methylpyrazole and 3,5-dimethylpyrazole; an oxime such as N-hydroxy succinimide, cyclohexanone oxime, 4-methyl-2-pentanone oxime, methyl ethyl ketone oxime; an amide such as ε-caprolactam, N-methylacetamide, succinimide or acetanilide.

The hydroxyl equivalent weight of the polyether polyol(s) used to make the prepolymer preferably is at least 1500 and is preferably up to 3000.

The polyether polyol(s) used to make the prepolymer preferably have a nominal functionality of 2 to 6, preferably 2 to 4 and more preferably 2 to 3. The polyether polyol(s) typically are made by adding an alkylene oxide onto an initiator compound. The "nominal functionality" of a polyether polyol refers to the average number of alkoxylatable groups per molecule on the initiator compound(s) used to make the polyether polyol. Actual functionalities may be somewhat lower than nominal functionalities in some instances.

Initiators that are useful for producing the polyether polyol(s) include, for example, water, ethylene glycol, diethylene glycol, triethylene glycol, 1,2-propane diol, dipropylene glycol, tripropylene glycol, glycerin, trimethylolpropane, trimethylolethane, pentaerythritol and other aliphatic polyalcohols having a hydroxyl equivalent weight up to about 400. Primary and secondary amines are also useful initiators, but may cause the polyols to be more reactive than desired, so hydroxyl containing initiators are preferred.

A preferred polyether polyol is prepared by adding propylene oxide and ethylene oxide to a difunctional or trifunctional initiator to produce a polyol having a hydroxyl equivalent weight of 1500 to 2500, especially 1800 to 2200, and containing 5 to 30% by weight polymerized ethylene oxide. The polymerized ethylene oxide may be randomly polymerized with the propylene oxide, may form one or more internal blocks and/or, most preferably, may form terminal blocks that result in primary hydroxyl groups.

An especially preferred type of polyether polyol is made by homopolymerizing propylene oxide or randomly copolymerizing 75-99.9 weight percent propylene oxide and 0.1 to 25 weight percent ethylene oxide onto a trifunctional initiator, and optionally capping the resulting polyether with up to 30% by weight (based on total product weight) ethylene oxide to form a polyether polyol having an equivalent weight of at least 1000 and up to 60, more preferably up to 50, microequivalents of terminal unsaturation per gram of polyol. This polyol preferably has an equivalent weight of 1000 to 3000, especially 1500 to 2500.

The aromatic polyisocyanate used to make the prepolymer may be, for example, m-phenylene diisocyanate, 2,4- and/or 2,6-toluene diisocyanate (TDI), the various isomers of diphenylmethanediisocyanate (MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3,3'-dimethyldiphenylmethane-4,4'-diisocyanate, 4,4',4"-triphenylmethane triisocyanate, polymethylene polyphenylisocyanates, hydrogenated polymethylene polyphenylisocyanates, toluene-2,4,6-triisocyanate, and 4,4'-dimethyl diphenylmethane-2,2',5,5'-tetraisocyanate. Preferred polyisocyanates have an average of 1.9 to 2.3 isocyanate groups per molecule, especially from 2 to 2.2 isocyanate groups per molecule and an isocyanate equivalent weight of 125 to 200. The aromatic polyisocyanates may contain uretondione, uretonimine, isocyanurate, biuret, allophonate, carbodiimide, urethane or urea linkages.

Especially preferred polyisocyanates are diphenylmethane diisocyanate (MDI), including the 2,4'-, 2,2'- and 4,4'-isomers or mixtures of two or more of such isomers, "polymeric" MDI products which include a mixture of MDI and one or more polymethylene polyphenylisocyanates, and modified MDI product that contain uretondione, uretonimine, isocyanurate, biuret, allophonate, carbodiimide, urethane or urea linkages and have an isocyanate equivalent weight of 130 to 200.

The prepolymer is present in the reaction mixture in an amount sufficient to provide an isocyanate index of 80 to 130. A preferred isocyanate index is 90 to 125, and a still more preferred isocyanate index is 90 to 115.

The catalyst is a non-mercury catalyst, by which is meant a catalyst that does not contain mercury compounds other than possibly as a trace impurity (constituting no more than 0.1% by weight of the weight of the catalyst). The catalyst (and the amount used) preferably is selected to provide a slow initial reaction for a period of 1 to 10 minutes, followed by an accelerated cure. The catalyst may be a thermally activated type, such as an encapsulated or blocked type.

Various types of amines and metal urethane catalysts are useful, including, for example, certain tertiary phosphines such as a trialkylphosphine or dialkylbenzylphosphine; chelates of metals such as Be, Mg, Zn, Cd, Pd, Ti, Zr, Al, Sn, As, Bi, Cr, Mo, Mn, Fe, Co and Ni; metal salts of strong acids, such as ferric chloride, stannic chloride, stannous chloride, antimony trichloride, bismuth nitrate and bismuth chloride; strong bases, such as alkali and alkaline earth metal hydroxides, alkoxides and phenoxides; alcoholates or phenolates of various metals, such as $Ti(OR)_4$, $Sn(OR)_4$ and $Al(OR)_3$, wherein R is alkyl or aryl, and the reaction products of the alcoholates with carboxylic acids, beta-diketones and 2-(N,N-dialkylamino)alcohols; alkaline earth metal, Bi, Pb, Sn or Al carboxylate salts; and tetravalent tin compounds, and certain tri- or pentavalent bismuth, antimony or arsenic compounds. Also useful are blocked amine catalysts as described in WO 2013/04333, copper catalysts as described in WO 2012/06263, zinc catalysts as described in WO 2012/06264, and substituted bicyclic amidine catalysts as described in WO 2013/002974.

A preferred catalyst is a zinc carboxylate catalyst. The zinc carboxylate catalyst is a zinc salt of a carboxylic acid. The carboxylic acid is preferably a monocarboxylic acid having 2 to 24, preferably 2 to 18, more preferably 6 to 18 and especially 8 to 12, carbon atoms. A mixture of carboxylates may be present.

All or a portion of the zinc carboxylate catalyst may engage in a rearrangement to form species which contain Zn—O—Zn linkages. These species are considered as zinc carboxylates for purposes of this invention.

The preferred zinc carboxylate catalyst may be used by itself or in combination with one or more other metal carboxylate catalysts. The other metal may be, for example, a group 3-12 metal other than mercury. The zinc carboxylate preferably constitutes at least 90 weight percent, at least 99 weight percent or at least 99.9 weight percent of such a mixture. A particularly useful catalyst mixture is a mixture of 98-99.99 weight percent of one or more zinc carboxylates and 0.01 to 2 weight percent of one or more zirconium carboxylates. Such a mixture may contain small amounts (up to 5 weight percent, more preferably up to 0.5 weight percent and even more preferably up to 0.01 weight percent) of other metal (other than mercury, zinc or zirconium) carboxylates.

The amount of zinc carboxylate catalyst may be 0.01 to 1 part, preferably 0.01 to 0.5 part and more preferably 0.01 to 0.2 parts per 100 parts by weight polyether polyol.

In some embodiments, no mercury-containing catalyst, nitrogen-containing catalyst, tin catalyst, or other catalyst for the reaction of polyol groups with isocyanate groups is present. The reaction mixture is also essentially devoid of mercury compounds, preferably containing no more than 0.01 weight percent mercury, more preferably containing no more than 0.001 weight percent mercury.

Upon curing, the microspheres become embedded in a polyurethane matrix that forms in the curing reaction. Apart from the presence of the microspheres themselves, the polyurethane matrix is preferably non-cellular, as a cellular material becomes easily crushed under high submarine pressures. Accordingly, the reaction mixture preferably has at most very small quantities (such as up to 0.5% by weight in total) of water or other chemical or physical blowing agent. Preferably, physical blowing agents and chemical blowing agents other than water are not added into the reaction mixture. Commercially available polyether polyols often contain small amounts, such as up to 0.25 weight percent, of water, and this water may be carried into the reaction mixture with the polyether polyol(s). Other starting materials may contain similarly small amounts of water. It is preferred, however, not to add water in addition to that (if any) carried in with the raw materials and it is in any case preferred that the reaction mixture contains no more than 0.25 weight percent water, preferably no more than 500 parts per million water, based on the entire weight of the reaction mixture.

Moreover, it is preferred to include one or more components that function to help prevent foaming. One such component is a water scavenger, i.e., a material that adsorbs or absorbs water or otherwise ties up any water as may be present and thereby reduce the ability of that water to react with isocyanates during the curing reaction. Zeolites, molecular sieves, fumed silica and other desiccants can be used for this purpose. An anti-foam agent of various types can be used. The anti-foam agent acts to destabilize any gas bubbles as may form in the reaction mixture and cause them to collapse. Water scavengers and anti-foam agents are typically used in small amounts, such as 0.1 to 5 parts by weight per 100 parts by weight of the polyether polyol.

The reaction mixture may contain one or more isocyanate-reactive materials in addition to the chain extender and the polyether polyol described above. However, such isocyanate-reactive materials, if used at all, are preferably used in small amounts, such as up to 5 parts by weight total per 100 parts by weight of the chain extender. Examples of additional isocyanate-reactive materials of this type include one or more polyols having an equivalent weight of up to about 3000. Among these are polyether polyols as described above with respect to making the prepolymer. Other isocyanate-reactive materials that may be present include polyester polyols, polyether polyols having equivalent weights of 250 to 1000, crosslinkers (compounds having 3 or more hydroxyl groups or 1 or more primary or secondary amino groups and an equivalent weight of up to 250), and the like.

Other optional ingredients include epoxy resins, particulate fillers (in addition to the microspheres), fibers, reinforcing agents, colorants, biocides, preservatives and antioxidants. Fillers, fibers and reinforcing agents may be used in weights up to 200 parts per 100 parts by weight polyether polyol, but preferably are used in small quantities, such as up to 50 parts or up to 20 parts by weight per 100 parts by weight polyether polyol, and may be omitted entirely. Colorants, biocides, preservatives and antioxidants preferably are used in very small quantities, such as up to 5 or up to 2 parts by weight per 100 parts by weight polyether polyol, if used at all.

Another optional ingredient is a ß-diketone compound. The ß-diketone is a compound in which two keto groups are separated by a methylene group, including compounds having the structure:

wherein each R is independently hydrocarbyl or inertly substituted hydrocarbyl. Preferably, each R is independently an alkyl group, which may be linear, branched or cyclic, which may by aryl-substituted or otherwise inertly substituted. More preferably, each R is independently an alkyl group (linear, branched or cyclic) having 1 to 8, especially 1 to 4 carbon atoms.

Examples of ß-diketone compounds are acetylacetone (pentane-2,4-dione), hexane-2,4-dione, heptane-3,5-dione, 2,2,6,6-tetramethyl-3,5-heptanedione, and the like.

The presence of a ß-diketone compound has been found to improve the bond between multiple sections of the syntactic polyurethane elastomer, when such sections are formed sequentially as described below. The bond strength is in some cases increased very substantially when the ß-diketone compound is present. Additionally, when the ß-diketone compound is included in the reaction mixture, the bond line, when visualized microscopically at a magnification of 100×, is often seen to have fewer defects, compared to when the ß-diketone compound is not present in an otherwise identical formulation, to the point that no defects are visible under such magnification. The bondline in some cases is no longer visible under such magnification. This effect is seen especially when the non-mercury catalyst is a zinc carboxylate catalyst.

The ß-diketone compound may constitute, for example, at least 0.05, at least 0.06, or at least 0.10 to 1% of the combined weight of all components of the reaction mixture except the polyisocyanate(s). In some embodiments, the ß-diketone constitutes up to 0.5% or up to 0.25% of such weight. A preferred amount is 0.06 to 0.5%. A more preferred amount is 0.10 to 0.25% and a still more preferred amount is 0.1 to 0.2%, on the same basis as before.

Alternatively, the amount of the ß-diketone compound can be expressed in terms of the amount of non-mercury catalyst, particularly when the non-mercury catalyst is a metal catalyst. The weight of ß-diketone compound may be, for example, 1 to 10, preferably 1 to 5, more preferably 2 to 5 and still more preferably 3 to 4 times that of the metal non-mercury catalyst(s).

Still another optional ingredient is an epoxy resin, which may constitute, for example 1 to 15, preferably 3 to 10 and more preferably 3 to 7 percent of the combined weight of all ingredients except the polyisocyanate(s). The presence of the epoxy resin has been found to produce smaller hard segment domains, which in turn is believed to have a beneficial effect on the ability of the syntactic polyurethane elastomer to adhere to itself. Epoxy resins include, for example, glycidyl ethers of bisphenols, epoxy novolac resins, epoxy cresol resins, and the like, especially those having an epoxy equivalent weight of up to 500 or up to 250.

A syntactic polyurethane elastomer is formed by mixing the various components and allowing them to cure. It is often convenient to formulate the components into a polyol component which contains the chain (and any other isocyanate-reactive species, as may be present) and a separate isocyanate component that contains the prepolymer. Other ingredients can be formulated into either the polyol or isocyanate component, although it is typical to formulate most or all of these into the polyol component. To make the syntactic polyurethane elastomer, the polyol component and isocyanate component are mixed at proportions sufficient to provide an isocyanate index as indicated above, and allowed to cure.

The components can be heated when mixed or mixed at ambient temperature. Preheating can be to 30 to 100° C., for example. The components are generally cured in a mold; the mold can be preheated if desired to a similar temperature. Heat can be applied throughout the curing process if desired; but this is not always necessary or desirable, as the curing reaction is exothermic. If an elevated curing temperature is used, the elevated temperature may be at least 60° C., at least 80° C., at least 100° C. or at least 120° C. Curing is performed until the polyurethane has developed enough strength to be demolded without permanent damage or distortion. Once demolded, the syntactic polyurethane elastomer can be post-cured if desired.

The cured syntactic elastomer includes a polyurethane matrix formed in the curing action, in which the microspheres are embedded. The content of microspheres will generally be essentially the same as the content of microspheres in the reaction mixture. As before, the polyurethane matrix preferably is non-cellular apart from the presence of the embedded microspheres.

The invention has particular advantages in applications in which multiple sections of the syntactic polyurethane elastomer are applied to a substrate, such that the successively-applied sections meet and form a bondline. In such embodiments, a first reaction mixture as described herein is applied to the substrate and at least partially cured to form a first section of syntactic polyurethane elastomer. The curing in this step is continued until the polymer has developed enough green strength to be demolded (if in a mold) or otherwise to maintain its shape during subsequent operations. Then, a second reaction mixture as described herein is applied to the substrate and in contact with the first section of syntactic polyurethane elastomer. This forms a bondline between the first section of syntactic polyurethane elastomer and the second reaction mixture. The second reaction mixture is then at least partially cured to form the second section of syntactic polyurethane elastomer adherent to the first section of syntactic polyurethane elastomer. The bond strength at the bondline is preferably at least 5 MPa, more preferably at least 6 MPA and still more preferably at least 8 MPa, as measured by ASTM D638, modified to use a test sample that contains the bondline.

The foregoing process can be extended to any number of applied sections.

The individual sections may cover all or only a portion of the substrate. The second and any successive sections may be applied on top of the first section, to form a multilayer syntactic polyurethane coating. Alternatively, the different sections may be applied to adjacent portions of the substrate such that the later-applied section(s) come into contact with one or more earlier-applied section(s) to form a bondline. By "bondline", it is meant the point or points at which the sections are in contact with each other.

Pipelines (including subsea pipelines or land pipelines) and subsea architecture are substrates of particular interest to this invention. Such a substrate can be made of any material that is suitable for its intended use, provided it can withstand the temperatures of the polyurethane-curing process. Polymeric and ceramic materials can be used to make the substrate, and these materials can be reinforced if desired. The preferred materials of construction for pipelines and subsea architecture are metals, especially steel. The substrate may also be coated with a corrosion inhibiting material, including, for example, fusion-bonded epoxy, thermally-sprayed aluminum, a liquid-curable epoxy resin, and the like, prior to being coated with thermal insulation.

The pipe segments may be, for example, 1 to 20 meters in length, and 2 centimeters to 2 meters in diameter. The pipe segments may have diameters of at least 10 centimeters or at least 15 centimeters, and may have diameters up to 1 meter, up to 0.5 meters or up to 0.35 meters. The insulation layer may be 1 centimeters to 25 centimeters thick. The ends of the pipe segments may be flanged or otherwise adapted (via various fittings, for example) to be joined to an adjacent pipe segment to produce a joint between the adjacent pipe segments.

The pipe or undersea architecture may be linear or have a more complex structure. It may be, for example, branched, curved or have other non-linear configurations. It may have external features that protrude partially or completely through the applied syntactic polyurethane elastomer section(s). Another significant advantage of this invention is that the syntactic polyurethane elastomer section(s) are very resistant to cracking at or near branch points and at or near sites at which protrusions partially or completely through the layer(s). Prior to this invention, this performance has been difficult to achieve without using mercury catalysts.

For pipe and undersea architecture applications, the syntactic polyurethane elastomer may be applied in thicknesses of 2.5 to 20 cm, especially 5 to 12 cm. These thicknesses are usually sufficient to provide the necessary thermal insulation.

Figure 2:
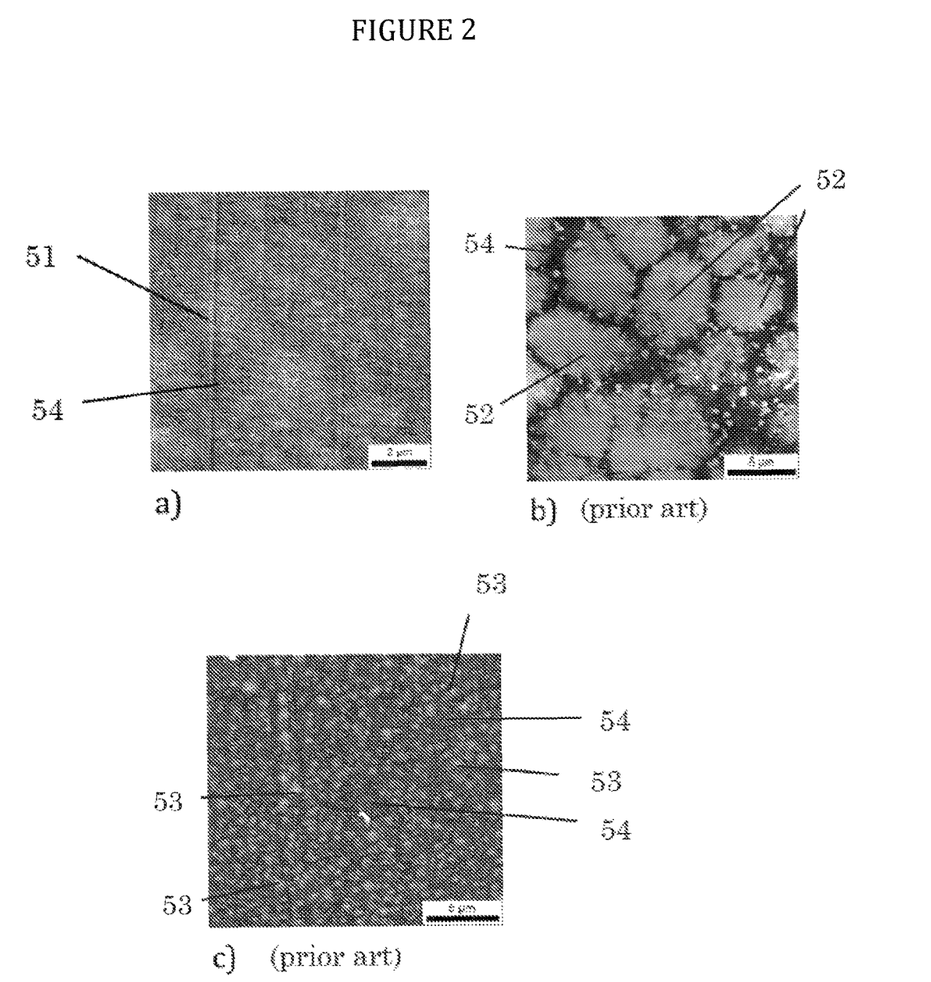
FIG. 2a) is a micrograph of a syntactic polyurethane elastomer of the invention.
FIG. 2b) is a micrograph of a prior art syntactic polyurethane elastomer.
FIG. 2c) is a micrograph of a prior art syntactic polyurethane elastomer.

The cured syntactic polyurethane elastomer consists of a polyurethane matrix, which is preferably non-cellular, in which the microspheres are dispersed. The polyurethane matrix may have a morphology characterized by the presence of small discrete morphological domains on the order of 0.1 to 3 µm in diameter, and the substantial absence of discrete morphological domains on the order of 5 to 30 µm in diameter. "Diameter" here refers to the longest dimension, as the discrete morphological domains may not be strictly spherical. The presence and measurement of these discrete morphological domains can be seen using microscopic methods such as atomic force microscopy (AFM) which are capable of resolving features in the 100 nm to 100 µm size range. FIGS. 2a), 2b) and 2c) are micrographs of a syntactic polyurethane elastomer of this invention (FIG. 2a) and two prior art syntactic polyurethane elastomers. In FIG. 2a), discrete morphological domains 51 are seen to have diameters in the range of about 2 µm. When a syntactic polyurethane elastomer is made using the same ingredients (including the same catalyst) but without first forming the prepolymer, large discrete morphological domains form. In FIG. 2b) these large discrete morphological domains are indicated by reference numerals 52. FIG. 2c) is a micrograph of a conventional syntactic polyurethane elastomer made in a one-step process using a mercury catalyst. This material is seen to have similar morphology to this invention, in that discrete morphological domains 53 are small, being mainly less than 1 µm in diameter. The discrete morphological domains are dispersed in a continuous phase indicated generally in each of FIGS. 2a), 2b) and 2c) by reference numeral 54. The continuous phase is believed to consist mainly of polyether chains from the polyether polyol starting material.

Figure 1:
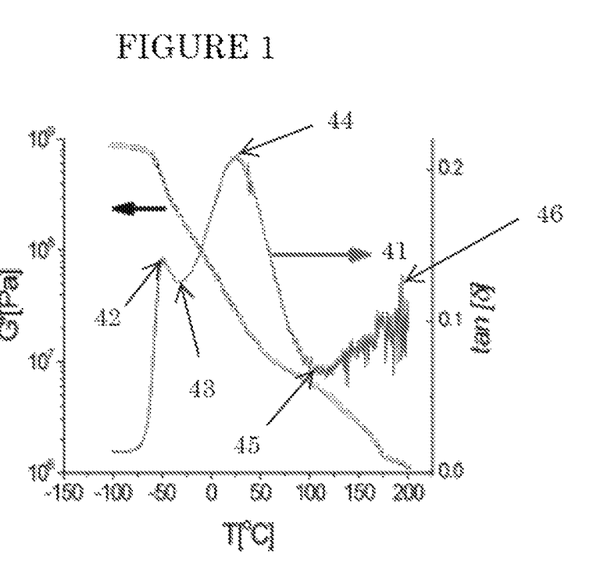
FIG. 1 is dynamic mechanical analysis curve for an embodiment of the invention.

On dynamic mechanical analysis, the syntactic polyurethane elastomer of this invention may exhibit a pronounced tan δ peak centered in the temperature range of 30 to 100° C. Tan δ at the maximum of this peak typically has a value of 0.15 to 0.3, more typically about 0.175 to 0.25. In FIG. 1, this peak on tan δ curve 41 is indicated by reference numeral 44. The tan δ curve often passes through a maximum in the range of –100° C. to –30° C. (FIG. 1, reference numeral 42), which is believed to represent the glass transition of a rubbery phase corresponding to the polyether polyol. The tan δ then goes through a minimum centered at about –30° C. to about 10° C. (FIG. 1, reference numeral 43), followed by the pronounced tan δ peak centered at 30 to 100° C. This maximum is then followed by another minimum centered above 100° C. (FIG. 1, reference numeral 45). Yet another maximum appears at temperatures greater than 150° C. (FIG. 1, reference numeral 46). This last maximum is believed to correspond to the glass transition of hard segment.

The maximum centered at 30 to 100° C. is believed to correspond to a relaxation of a partially or imperfectly ordered rigid phase, in which the hard segment (corresponding to domains rich in the reaction product of chain extender) is somewhat mixed with soft segment (i.e., the polyether chains brought into the polymer via the prepolymer).

DMA curves are conveniently obtained on 1-mm thick samples, using a strain-controlled rheometer such as an ARES 2000 rheometer manufactured by TA Instruments at an oscillation frequency of 6.2832 radians/second and a temperature ramp of 3° C. per minute over a temperature range of –100° C. to 200° C.

The following examples are provided to illustrate the invention, and are not intended to limit the scope thereof. All parts and percentages are by weight unless indicated otherwise.

EXAMPLE 1 AND COMPARATIVE SAMPLES A AND B

Polyol A is a nominally trifunctional polyether made by adding propylene oxide and then ethylene oxide to a trifunctional initiator. Polyol A contains about 15% ethylene oxide by weight. It contains mainly primary hydroxyl groups and has a hydroxyl equivalent weight of about 2050.

The Zn/Zr catalyst is a mixture of zinc and zirconium carboxylates in which the weight ratio of zinc to zirconium is 99-99.5:0.5-1. The catalyst contains some species having M-O-M linkages, wherein M stands for the metal, i.e. either Zn or Zr.

The microspheres are 3M grade S38HS glass microspheres.

Polyisocyanate A is a modified MDI having an isocyanate equivalent weight of 160 g/mol and an isocyanate functionality of about 2.

Polyurethane Elastomer Example 1 is made as follows: 62.5 g of Polyol A is reacted under nitrogen with 45.5 g Polyisocyanate A until the isocyanate content is reduced to about 8% by weight. Glass microspheres, yellow pigment, catalyst and antifoam are added to pre-polymer in amounts as set forth in Table 1.

TABLE 1

| Ingredient | Parts by weight |
| --- | --- |
| Prepolymer | 325.6 |
| Zn/Zr Catalyst/Acetylacetone | 0.10/0.4 |
| Antifoam | 0.06 |
| Glass microspheres | 73.2 |
| Pigment | 0.64 |

400 parts of the prepolymer mixture is then mixed with 30.9 parts of 1,4-butandiol. A portion of the resulting mixture is case into a mold preheated to 50° C. and cured at that temperature in the mold for 2 hours. A sample is taken to microscopy. A micrograph of the sample forms FIG. 2a). As can be seen in FIG. 2a), the sample contains small discrete morphological domains 51 but no large ones, similar to those of the mercury-catalyzed elastomer as shown in FIG. 2c). Another sample is evaluated by DMA using an ARES 2000 rheometer operated at an oscillation frequency of 6.2832 radians/second, and a temperature ramp of 3° C./minute over the temperature range –10 to 200° C. The DMA curve is shown in FIG. 1. A tan δ peak having a value of over 0.2 is centered at about 30° C.

Comparative Sample A is made using the same ingredients as used to make Example 1, except all the ingredients are reacted at once instead of first forming a prepolymer from the polyol and polyisocyanate. A micrograph of the resulting elastomer is shown in FIG. 2b). In contrast to the Example 1 material, this elastomer has very large discrete morphological domains. On DMA analysis, virtually no peak is seen in the tan δ curve between 30 and 100° C. The bond strength for Comparative Sample A is only about 3.1 MPa.

Comparative Sample B is made in a one-step process using the same ingredients, except the catalyst is an organomercury catalyst. FIG. 2c) is a micrograph of this elastomer. It contains small discrete morphological domains much like the Example 1 elastomer, and lacks the large discrete morphological domains seen in Comparative Sample A. On DMA, this material exhibits a prominent tan δ peak centered at about 70° C. At the maximum, this tan δ peak has a value of about 0.175.

SPECIFIC EMBODIMENTS

In specific embodiments, the invention is:
1. A cured syntactic polyurethane elastomer which is a reaction product of a reaction mixture comprising an alkylene glycol chain extender, 5 to 50 weight percent, based on the weight of the reaction mixture, of microspheres, an isocyanate-terminated prepolymer having an isocyanate content of 3 to 12% by weight, and a non-mercury catalyst, wherein (i) the prepolymer is the reaction product of at least one polyether polyol having a number average hydroxyl equivalent weight of at least 800 with an excess of an aromatic polyisocyanate, (ii) the amount of prepolymer provided to the reaction mixture is sufficient to provide an isocyanate index of 80 to 130, and (iii) the reaction mixture is essentially devoid of mercury compounds.

2. The preceding embodiment, wherein the cured syntactic elastomer comprises a polyurethane matrix in which the microspheres are embedded.

3. Any preceding embodiment, wherein the cured syntactic elastomer forms a coating on a substrate.

4. A method for making a syntactic polyurethane elastomer, comprising
a) forming a reaction mixture containing an alkylene glycol chain extender, 5 to 50 weight percent, based on the weight of the reaction mixture, of microspheres, an isocyanate-terminated prepolymer having an isocyanate content of 3 to 12% by weight, and a non-mercury catalyst, wherein (i) the prepolymer is the reaction product of at least one polyether polyol having a number average hydroxyl equivalent weight of at least 800 with an excess of an aromatic polyisocyanate, (ii) the amount of prepolymer provided to the reaction mixture is sufficient to provide an isocyanate index of 80 to 130, and (iii) the reaction mixture is essentially devoid of mercury compounds, and
b) curing the reaction mixture to form the syntactic polyurethane elastomer.

5. Any preceding embodiment wherein the reaction mixture contains 15 to 25 weight percent microspheres.

6. A process for producing a substrate having an applied syntactic polyurethane elastomer, comprising
a) forming a section of a syntactic polyurethane elastomer on at least a portion of the substrate by (1) applying a first reaction mixture containing an alkylene glycol chain extender, 5 to 35 weight percent, based on the weight of the reaction mixture, of microspheres, an isocyanate-terminated prepolymer having an isocyanate content of 3 to 12% by weight, and a non-mercury catalyst, wherein (i) the prepolymer is the reaction product of at least one polyether polyol having a number average hydroxyl equivalent weight of at least 800 with an excess of an aromatic polyisocyanate, (ii) the amount of prepolymer provided to the reaction mixture is sufficient to provide an isocyanate index of 80 to 130, and (iii) the reaction mixture is essentially devoid of mercury compounds, to at least a portion of the substrate and (2) at least partially curing the first reaction mixture to form the first section of syntactic polyurethane elastomer, and then
b) forming a second section of syntactic polyurethane elastomer on at least a portion of the substrate by (1) applying a second reaction mixture containing an alkylene glycol chain extender, 5 to 35 weight percent, based on the weight of the reaction mixture, of microspheres, an isocyanate-terminated prepolymer having an isocyanate content of 3 to 12% by weight, and a non-mercury catalyst, wherein (i) the prepolymer is the reaction product of at least one polyether polyol having a number average hydroxyl equivalent weight of at least 800 with an excess of an aromatic polyisocyanate, (ii) the amount of prepolymer provided to the reaction mixture is sufficient to provide an isocyanate index of 80 to 130, and (iii) the reaction mixture is essentially devoid of mercury compounds to at least a portion of the substrate and in contact with the first section of syntactic polyurethane elastomer to form at least one bondline between the first section of syntactic polyurethane elastomer and the second reaction mixture and (2) at least partially curing the second reaction mixture to form the second section of syntactic polyurethane elastomer adherent to the first section of syntactic polyurethane elastomer.

7. Embodiment 6, wherein the bondline has a bond strength of at least 8.0 MPa.

8. Embodiment 6, wherein the bondline has a bond strength of at least 8.0 MPa.

9. Any of embodiments 6-8, wherein the bondline is not visible under a magnification of 100×, and/or has no visible defects when visualized microscopically at a magnification of 100×.

10. Any of embodiments 3-9, wherein the substrate is a pipe (for subsea or land use) or undersea architecture.

11. Embodiment 10, wherein the a pipe (for subsea or land use) or undersea architecture is branched, curved or has another non-linear configuration.

12. Embodiment 10 or 11, wherein the a pipe (for subsea or land use) or undersea architecture has one or more external features that protrude partially or completely through the applied syntactic polyurethane elastomer.

13. Any preceding embodiment, wherein the polyether polyol used to make each respective isocyanate-terminated prepolymer is prepared by (A) adding propylene oxide and ethylene oxide to a difunctional or trifunctional initiator to produce a polyol having a hydroxyl equivalent weight of 1500 to 2500 and containing 5 to 30% by weight polymerized ethylene oxide, wherein the polymerized ethylene oxide is randomly polymerized with the propylene oxide, forms one or more internal blocks and/or forms terminal blocks that result in primary hydroxyl groups or (B). homopolymerizing propylene oxide or randomly copolymerizing 75-99.9 weight percent propylene oxide and 0.1 to 25 weight percent ethylene oxide onto a trifunctional initiator, and optionally capping the resulting polyether with up to 30% by weight (based on total product weight) ethylene oxide to form a polyether polyol having an equivalent weight of 1500 to 2500.

14. Any preceding embodiment, wherein the chain extender is 1,4-butanediol.

15. Any preceding embodiment, wherein the non-mercury catalyst is a zinc carboxylate or a mixture of 98-99.99 weight percent of one or more zinc carboxylates and 0.01 to 2 weight percent of one or more zirconium carboxylates.

16. Any preceding embodiment, wherein each respective reaction mixture contains 15 to 25 weight percent microspheres.

17. Any preceding embodiment, wherein the reaction mixture contains a ß-diketone compound.

18. Embodiment 17, wherein the ß-diketone is a compound having the structure:

wherein each R is independently hydrocarbyl or inertly substituted hydrocarbyl.

19. Embodiment 18, wherein each R is independently a linear, branched or cyclic alkyl group having 1 to 4 carbon atoms.

20. Embodiment 17, wherein the ß-diketone compound is one or more of acetylacetone (pentane-2,4-dione), hexane-2,4-dione, heptane-3,5-dione and 2,2,6,6-tetramethyl-3,5-heptanedione.

21. Any of embodiments 17-20, wherein the non-mercury catalyst is one or more metal catalyst(s), and the weight of the ß-diketone compound 1 to 10 times that of the metal non-mercury catalyst(s).

22. Embodiment 21, wherein the non-mercury catalyst is one or more metal catalyst(s), and the weight of the ß-diketone compound 2 to 5 times that of the metal non-mercury catalyst(s).

23. Embodiment 21, the non-mercury catalyst is one or more metal catalyst(s), and the weight of the ß-diketone compound 3 to 4 times that of the metal non-mercury catalyst(s).

24. Any preceding embodiment, wherein the reaction mixture contains at least one water scavenger.

What is claimed is:

1. A process for producing a substrate having an applied syntactic polyurethane elastomer, comprising
   a) forming a section of a syntactic polyurethane elastomer on at least a portion of the substrate by (1) applying a first reaction mixture containing an alkylene glycol chain extender, 5 to 35 weight percent, based on the weight of the reaction mixture, of microspheres, an isocyanate-terminated prepolymer having an isocyanate content of 3 to 12% by weight, based on the weight of the isocyanate-terminated prepolymer, and a non-mercury catalyst, wherein (i) the prepolymer is the reaction product of at least one polyether polyol having a number average hydroxyl equivalent weight of at least 800 with an excess of an aromatic polyisocyanate, (ii) the amount of prepolymer provided to the reaction mixture is to provide an isocyanate index of 80 to 130, (iii) wherein the non-mercury catalyst is a zinc carboxylate or a mixture of 98-99.99 weight percent of one or more zinc carboxylates and 0.01 to 2 weight percent of one or more zirconium carboxylates and (iv) the reaction mixture is devoid of mercury compounds, to at least a portion of the substrate and (2) partially curing the first reaction mixture to maintain its shape to form the first section of syntactic polyurethane elastomer, and then
   b) forming a second section of syntactic polyurethane elastomer on at least a portion of the substrate by (1) applying a second reaction mixture containing an alkylene glycol chain extender, 5 to 35 weight percent, based on the weight of the reaction mixture, of microspheres, an isocyanate-terminated prepolymer having an isocyanate content of 3 to 12% by weight, based on the weight of the isocyanate-terminated prepolymer, and a non-mercury catalyst, wherein (i) the prepolymer is the reaction product of at least one polyether polyol having a number average hydroxyl equivalent weight of at least 800 with an excess of an aromatic polyisocyanate, (ii) the amount of prepolymer provided to the reaction mixture is to provide an isocyanate index of 80 to 130, (iii) wherein the non-mercury catalyst is a zinc carboxylate or a mixture of 98-99.99 weight percent of one or more zinc carboxylates and 0.01 to 2 weight percent of one or more zirconium carboxylates and (iv) the reaction mixture is devoid of mercury compounds to at least a portion of the substrate and in contact with the first section of syntactic polyurethane elastomer to form at least one bondline between the first section of syntactic polyurethane elastomer and the second reaction mixture and (2) partially curing the second reaction mixture to form the second section of syntactic polyurethane elastomer adherent to the first section of syntactic polyurethane elastomer, wherein the bondline has a bond strength of at least 8.0 MPa, as measured according to ASTM D638.

2. The process of claim 1 wherein the substrate is an undersea pipe or undersea architecture.

3. The process of claim 2 wherein the undersea pipe or undersea architecture is branched, curved or has another non-linear configuration.

4. The process of claim 2 wherein the undersea pipe or undersea architecture has one or more external features that protrude partially or completely through the applied syntactic polyurethane elastomer.

5. The process of claim 1, wherein the polyether polyol used to make the isocyanate-terminated prepolymer is prepared by (A) adding propylene oxide and ethylene oxide to a difunctional or trifunctional initiator to produce a polyol having a hydroxyl equivalent weight of 1500 to 2500 and containing 5 to 30% by weight polymerized ethylene oxide, based on total product weight, wherein the polymerized ethylene oxide is randomly polymerized with the propylene oxide, forms one or more internal blocks and/or forms terminal blocks that result in primary hydroxyl groups or (B) homopolymerizing propylene oxide or randomly copolymerizing 75-99.9 weight percent propylene oxide and 0.1 to 25 weight percent ethylene oxide onto a trifunctional initiator, and optionally capping the resulting polyether with up to 30% by weight, based on total product weight ethylene oxide to form a polyether polyol having an equivalent weight of 1500 to 2500.

6. The process of claim 5, wherein the chain extender is 1,4-butanediol.

7. The process of claim 1 wherein each respective reaction mixture contains 15 to 25 weight percent microspheres.

* * * * *